United States Patent
Kouninski

(10) Patent No.: US 7,742,059 B2
(45) Date of Patent: Jun. 22, 2010

(54) FILLING BLANK SPACES OF A DISPLAY SCREEN

(75) Inventor: Andrey Kouninski, Alpharetta, GA (US)

(73) Assignee: Scientific-Atlanta, LLC, Lawrenceville, GA (US)

( * ) Notice: Subject to any disclaimer, the term of this patent is extended or adjusted under 35 U.S.C. 154(b) by 491 days.

(21) Appl. No.: 11/427,673

(22) Filed: Jun. 29, 2006

(65) Prior Publication Data

US 2008/0001971 A1    Jan. 3, 2008

(51) Int. Cl.
G09G 5/02 (2006.01)
H04N 3/20 (2006.01)

(52) U.S. Cl. ..................... 345/598; 348/173

(58) Field of Classification Search .............. 345/606, 345/660, 589, 598, 599, 597; 348/173, 556
See application file for complete search history.

(56) References Cited

U.S. PATENT DOCUMENTS

| | | | |
|---|---|---|---|
| 6,343,147 B2* | 1/2002 | Yamamoto | 382/167 |
| 2003/0142212 A1* | 7/2003 | Grimes et al. | 348/173 |
| 2004/0119891 A1* | 6/2004 | Barnichon | 348/556 |
| 2004/0233229 A1 | 11/2004 | Kimura | |
| 2004/0249291 A1 | 12/2004 | Honda et al. | |
| 2005/0068466 A1 | 3/2005 | Waters et al. | |
| 2006/0221186 A1* | 10/2006 | Lin et al. | 348/173 |

FOREIGN PATENT DOCUMENTS

| | | |
|---|---|---|
| EP | 1 489 589 | 12/2004 |
| WO | WO 2005/009024 | 1/2005 |

* cited by examiner

Primary Examiner—Ryan R Yang
(74) Attorney, Agent, or Firm—Merchant & Gould

(57) ABSTRACT

Systems and methods, including methods performed by a processing device, are disclosed herein for filling the unused or blank spaces of a display screen. In one exemplary system, among others, the system comprises a display screen configured to display video images and a display screen controller configured to control the display screen. The display screen controller comprising a device for sampling a plurality of pixels from a stream of video images and a device for calculating an average color of the plurality of sampled pixels. Also, the display screen controller includes a device for adding color bands in unused portions of the display screen, the color bands comprising a color corresponding to the calculated average color. With the present system, the difference between the burn-in pattern of a video image and the unused portions of the display screen is reduced, thereby preserving the integrity of the display screen.

20 Claims, 6 Drawing Sheets

ADJUSTING COLOR BANDS
(located outside the boundary of the actual video image)

COLOR:
- ☒ chameleon
- ☐ black
- ☐ white
- ☐ black/white
- ☐ gray
- ☐ black/white/gray
- ☐ red
- ☐ green
- ☐ blue

RATE OF COLOR CHANGE:
- ☐ fast
- ☐ medium fast
- ☒ medium
- ☐ medium slow
- ☐ slow

MATCHING PORTION:
- ☒ match entire image
- ☐ match background
- ☐ match foreground

FIG. 12

CAUTION: The selected color may result in uneven burning of the television screen.

BACK    END

FIG. 13

FILLING BLANK SPACES OF A DISPLAY SCREEN

TECHNICAL FIELD

The present disclosure is generally related to control devices for controlling display screens.

BACKGROUND

Reference is first made to FIGS. 1-4. In FIG. 1, a standard definition (SD) television set 10 is illustrated having a format for displaying video images with an aspect ratio of 4:3. The "aspect ratio" is the proportion of the width of a video image with respect to its height. SD broadcast signals conform to the 4:3 format and can be displayed over the entire screen of the traditional SD television set 10. FIG. 2 illustrates a high-definition television (HDTV) set 20, which has an aspect ratio of 16:9 for displaying high-definition (HD) signals also having a 16:9 aspect ratio. With respect to cinematography, aspect ratios of 2.39:1 and 1.85:1 are common, but do not match the format of the SD television set 10.

Because of the difference in aspect ratios, the SD television set 10 is normally unable to display cinematic movies over the entire screen thereof. Also, the HDTV set 20 is normally unable to display SD video images over the entire screen of the HDTV set 20. When the aspect ratio of a display screen, such as the SD television set 10 or HDTV set 20, is different from the video image being displayed, certain adjustments are made so that the video images can be easily viewed. For example, a control device (not shown), which controls the video images to be displayed on the display screen, may crop a portion of video image so that the image covers the entire screen. Alternatively, the control device may fit the video image such that there will remain unused or blank spaces on the screen, which is the typical solution to accommodate differences in aspect ratios. In this typical solution, black bands are typically added in the unused spaces. In FIG. 3, the SD television set 10 of FIG. 1 displays a "wide-screen" video image 12, such as a cinematic movie, the width of which is bounded by the left and right sides of the screen of the SD television set 10. Blank spaces 14 and 16 are positioned above and below the video image 12 in a "letterbox" configuration. In FIG. 4, an SD video image 22 is displayed on the HDTV set 20 of FIG. 2. The height of the SD video image 22 is bounded by the top and bottom of the screen of the HDTV set 20 and blank spaces 24 and 26 are positioned to the left and right of the SD video image 22 in a "pillarbox" configuration.

Typically, these blank spaces 14, 16, 24, and 26 are simply configured as black bands filling the empty portions of the screen. However, there is a problem that can arise when the unused spaces are filled with black bands. Over extended periods of time, the portion of the display screen that includes the images 12 and 22 will experience a burn-in effect that is more severe than the unused black portions of the screen. The images 12 and 22 may imprint a burn pattern on the lumino-phor or phosphor material of the display screen 10 and 20. Since the black bars 14, 16, 24, and 26 create little or no burn-in effect on the unused portions of the screen, these portions will not be burned to such an extent, thereby resulting in an uneven burn pattern. With an uneven burn pattern, unnatural lines or bars might be created on the display screen that may be visible when later images are shown. Also, these unequal burn patterns can be permanently imprinted on a display screen and are undesirably distracting to viewers.

One solution to the problem of unequal burning on a display screen has been to color the unused spaces gray. In theory, by exposing the unused portions of the screen to a neutral color between the extremes of white or black, the gray blocks are intended to burn the unused portions of the screen to a similar extent as the burning where the actual video image is displayed. However, the gray color may appear unnatural compared to colorful images and may be distracting to a viewer. Also, the illumination of gray may not necessarily burn the unused portions equally with the regular image, thereby still creating the undesirable burn lines or bars. Thus, a need exists in the field of television to address the aforementioned deficiencies and inadequacies of the conventional systems for filling the unused spaces of a display screen.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 12 is a diagram illustrating an embodiment of an interactive screen allowing a viewer to adjust the background color bands.

FIG. 13 is a diagram illustrating an embodiment of a screen shot warning the viewer of possible negative effects of the selections made using the interactive screen of FIG. 12.

DETAILED DESCRIPTION OF THE DISCLOSURE

Figure 1:
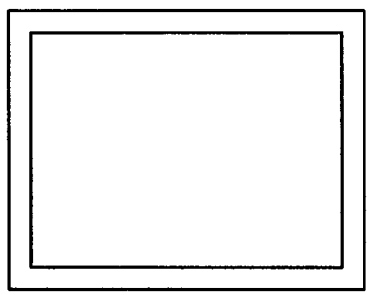
FIG. 1 is a front view of a conventional standard-definition (SD) television set.
Figure 2:
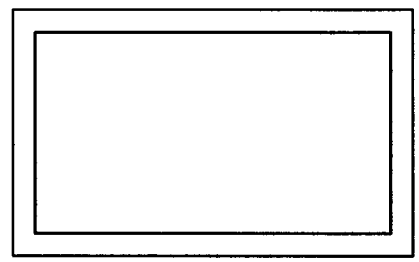
FIG. 2 is a front view of a conventional high-definition television (HDTV) set.
Figure 3:
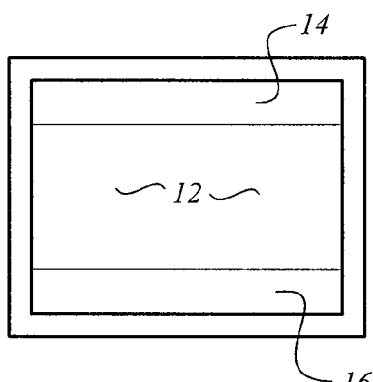
FIG. 3 is a front view of the SD television set of FIG. 1 displaying a wide-screen video image.
Figure 4:
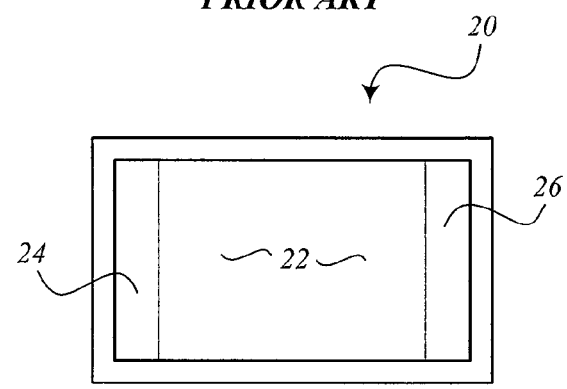
FIG. 4 is a front view of the HDTV set of FIG. 2 displaying an SD video image.

Embodiments of the present disclosure provide systems and methods for filling the unused or blank spaces of a display screen. Briefly described, in architecture, one exemplary embodiment of a system, among others, can be implemented as follows. The exemplary system comprises a display screen configured to display video images and comprises a display screen controller configured to control the display screen. The display screen controller comprises a module for sampling a plurality of pixels from a stream of video images and a module for calculating an average color of the plurality of sampled pixels. The display screen controller also comprises a module for adding color bands in unused portions of the display screen, the color bands comprising a color corresponding to the calculated average color.

Embodiments of the present disclosure can also be viewed as providing methods or processes for filling the unused portions of a display screen. In this regard, one embodiment of such a method, among others, can be broadly summarized by the following. The exemplary method includes determining whether or not the aspect ratio of a stream of video images to be displayed is the same as the aspect ratio of a display screen configured to display the stream of video images. Further, the method includes filling blank spaces of the display screen with color bands having a color representing an approximation of a predominant color of at least a portion of the stream of video images when it is determined that the aspect ratio of the stream of video images is not the same as the aspect ratio of the display screen.

Another embodiment of the present disclosure includes a computer-readable medium having a computer program for filling the unused portions of a display screen. The computer program, in this embodiment, comprises logic configured to sample a plurality of pixels from a plurality of frames of video images to be displayed on a display screen. Also, the computer program includes logic configured to process the samples to determine a background color representing an approximation of a predominant color of the video images and logic configured to fill unused spaces of the display screen with the determined background color.

Other systems, methods, features, and advantages of the present disclosure will become apparent to one with skill in the art upon examination of the following drawings and detailed description. It is intended that all such additional systems, methods, features, and advantages be included within this description, be within the scope of the present disclosure, and be protected by the accompanying claims.

The aspect ratio of a display screen, such as a television set, computer monitor, or the like, may be different than the actual video image that is intended to be displayed on the display screen. For example, standard definition (SD) television sets are designed to display SD broadcasts having an aspect ratio of 4:3, and high-definition television (HDTV) sets are designed to display HDTV broadcasts having an aspect ratio of 16:9. When the aspect ratio of the video image is different than the display screen, black colored bars are usually created to fill the unused spaces of the display screen. A gray color is some times used to fill the unused spaces in an attempt to provide a more equal burn pattern on the portions of the display screen that are outside the boundary of the video image. Gray, however, appears unnatural compared to an image that may be brightly colored. Also, such a gray color may be distracting to a viewer.

The present application discloses systems and methods for filling the unused spaces of a display screen with a color that more closely resembles the actual video image. By taking random samples of the actual video image stream, an approximation of a predominant color can be made. Also, the intensity or brightness of the colors may also be calculated from the samples. Samples may be taken from pixels randomly selected from various locations of the active video images. From the samples, a color and intensity representative of the predominant color can be calculated and this color can be displayed in the unused portions of the display screen. In this way, a "background" color is displayed that more naturally frames the video image. Also, by matching an approximation of a predominant color and intensity, the burn pattern of the unused portion will be substantially similar to the burn pattern where the actual video image is displayed. In this way, distracting burn lines or bars will be reduced, thereby better preserving the integrity of the display screen.

Figure 5:
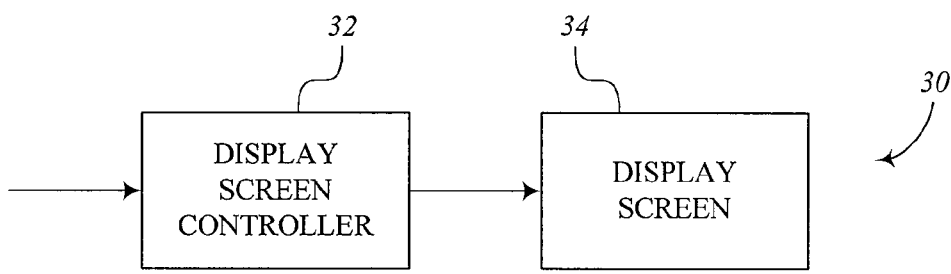
FIG. 5 is a block diagram of an embodiment of a video display system in accordance with the teachings of the present disclosure.

FIG. 5 is a block diagram of an embodiment of a portion of a video display system 30. The video display system 30, in general, includes a display screen controller 32 and a display screen 34. Preferably, the display screen controller 32 is a set-top box or digital home communication terminal (DHCT) configured to control a television. However, the display screen controller 32 may also be, for example, a computer, DVD player, VCR player, or other control device suitable for outputting to the display screen 34. The display screen 34 is preferably a television set, such as an HDTV set. Alternatively, the display screen 34 may be a computer monitor, laptop computer display, or other device for displaying video images. In another embodiment, the display screen controller 32 and display screen 34 may be combined into a single unit or split into multiple additional units.

In operation, the display screen controller 32 receives a video signal stream from another source and/or produces video signals internally. From the video signals, the display screen controller 32 determines whether or not the video signals are formatted with the same aspect ratio as the display screen 34. The display screen controller 32 may receive feedback from the display screen 34 to determine the format of the display screen 34. Alternatively, the display screen controller 32 may check a user or system operator setting, which may include a default. If the aspect ratios are the same, then the video signals are transmitted to the display screen 34 for display. However, if the aspect ratio of the video signals is different from the aspect ratio of the display screen 34, the display screen controller 32 is capable of performing a filling process according to the teachings of the present disclosure. The process involves centrally positioning the video images on the display screen and filling the unused portions of the display screen 34 with a certain background color. The display screen controller 32 may utilize a mathematical algorithm to determine the background color. The background color, as well as the luminance of the background color, is determined in order to closely match the color and luminance of the actual video image. In this way, the display screen controller 32 is able to provide video signals that reduce the negative effects of uneven burning on the display screen 34.

Figure 6:
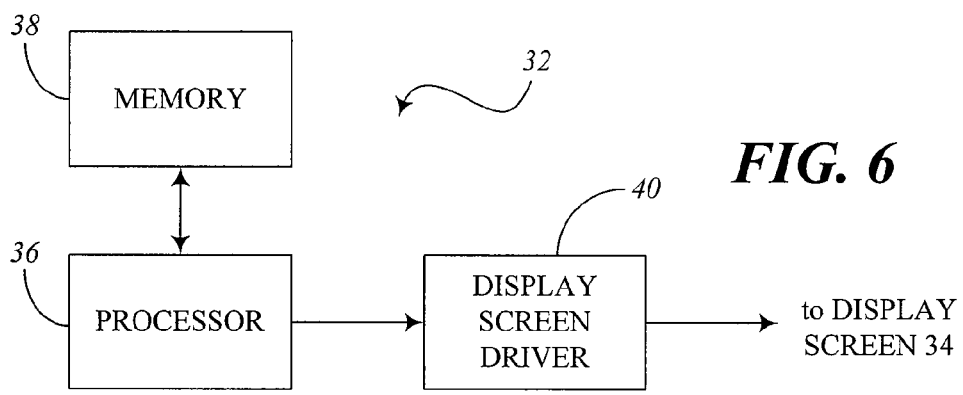
FIG. 6 is a block diagram of a first embodiment of the display screen controller shown in FIG. 5.

FIG. 6 is a block diagram of a first embodiment of the display screen controller 32 shown in FIG. 5. The display screen controller 32 may contain a portion of a general-purpose computer and/or may be configured in an application specific integrated circuit (ASIC). The display screen controller 32 comprises, among other things, a processor 36, memory 38, and a display screen driver 40. In this embodiment, the processor 36 may run software stored in memory 38. The software may include instructions for visually displaying information to a user. Also, the processor 36 may be configured to operate additional software designed to fill unused portions of the display screen 34, such as a computer monitor. The unused portions are filled with a background color that blends in with the actual portions of the video images. Utilizing this additional software, the processor 36 adds image information of the background color to the main image and instructs the display screen driver 40 to transmit the image information to the display screen 34. The processor 36, in combination with software in memory 38, may generate the main images internally within the computer or may receive image data from an external source, e.g. the Internet.

Figure 7:
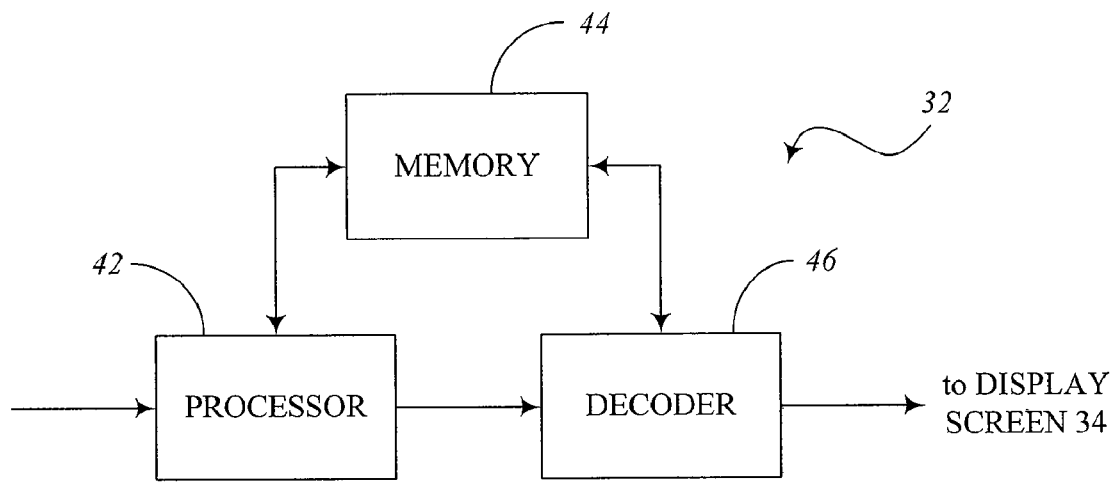
FIG. 7 is a block diagram of a second embodiment of the display screen controller shown in FIG. 5.

FIG. 7 is a block diagram of a second embodiment of the display screen controller 32 shown in FIG. 5. In this embodiment, the display screen controller 32 is a set-top box for controlling a television set. The set-top box 32 includes, among other things, a processor 42, memory 44, and a decoder 46. The processor 42 may be configured to receive analog and/or digital video signal streams. The processor 42 can be a part of the regular video processing system or separate. The processor 42 processes the signals and transmits the signals to the decoder 46, which may be configured as an MPEG decoder for decoding a digital MPEG video stream. The memory 44 can be dedicated memory or shared with other functions. The decoder 46 stores the decoded signals in memory 44, preferably within video frame buffers of the memory 44. The video signals stored in memory 44 may include any suitable color coding scheme and may include any suitable number of bits.

With a portion of a stream of video signals temporarily stored in memory 44, the processor 42 is able to access the video signals in memory 44. The processor 42 may then alter the signals by performing a filling function for filling the unused or blank spaces of the display screen 34, e.g. television set. The processor 42, as described in more detail with respect to FIG. 8, analyzes the video signals in real time and determines a background color to display in the spaces outside the boundary of the regular video images. The processor 42 may alter the existing video signals in memory 44 and/or add video signals for defining the background portion of the display screen. The decoder 46 also includes a digital encoder (not shown) having the capability of retrieving the video signals from the frame buffers of memory 44 and assembling the video information as analog signals. The assembled signals, including the regular video images and the background color bands, are transmitted to the display screen 34 for display.

The embodiments of the present disclosure for filling unused portions of a display screen can be implemented in hardware, software, firmware, or a combination thereof. In the preferred embodiment(s), the filling system is implemented in software or firmware that is stored in a memory, such as memory 44, and that is executed by a suitable instruction execution system, such as processor 42. If implemented in hardware, as in an alternative embodiment, the filling system can be implemented with any suitable combination of discrete logic circuits having logic gates for implementing logic functions upon data signals, an application specific integrated circuit (ASIC) having appropriate combinational logic gates, a programmable gate array(s) (PGA), a field programmable gate array (FPGA), etc.

Figure 8:
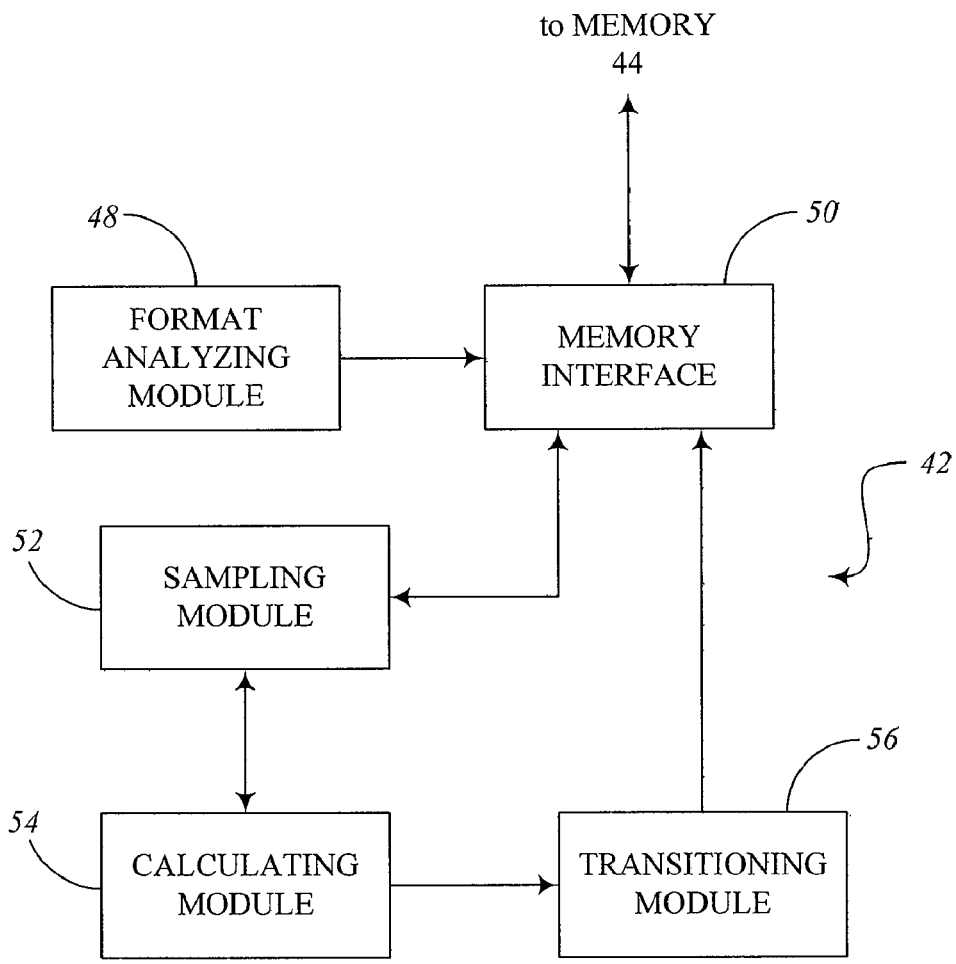
FIG. 8 is a block diagram of an embodiment of the processor shown in FIG. 7.

FIG. 8 is a block diagram of an embodiment of the processor 42 shown in FIG. 7 having functionality for performing the filling process, which may be stored in memory 44. The processor 42, according to this embodiment, includes, but is not limited to, a format analyzing module 48, a memory interface 50, a sampling module 52, a calculating module 54, and a transitioning module 56. For simplicity, only the portions of the processor 42 used for performing the function of filling unused portions of a video screen are illustrated in this embodiment. Each of these components may actually comprise multiple elements. Also, one or more of the components may be configured as a single element capable of performing the functions of one or more of the illustrated components. In addition, it should be recognized by one of ordinary skill in the art that the components of the processor 42 may actually be configured in software stored in memory 44.

In operation, the format analyzing module 48 analyzes incoming video signals and determines whether or not the aspect ratio of the video signals is the same as the aspect ratio of the display screen on which the video signals are to be displayed. If the aspect ratios are the same, then no additional processing is needed with regard to filling unused space since the video signal will fit normally within the boundaries of the display screen. However, if the aspect ratios are not the same, then the processor 42 will proceed with the operations described herein to fill the unused spaces. When it is determined that the aspect ratios are different, the format analyzing module 48 instructs the memory interface 50 to access the video signals from the frame buffers in memory 44. The format analyzing module 48 may also send a similar signal to the sampling module 52.

In response thereto, the memory interface 50 or sampling module 52 retrieves the video signals. The sampling module 52 may instruct the memory interface 50 to select a random sample of the video signals stored in memory or the memory interface 50 may be configured to automatically sample the signals randomly. In either case, the random sample of pixels of the video signals are passed along to the sampling module 52 where they may be temporarily stored in a first-in, first-out (FIFO) storage device (not shown). The memory interface 50 and sampling module 52 may be configured to sample any number of signals at any sampling rate to acquire a suitable sample for accurately representing the signals. For example, according to one embodiment, the sampling module 52 may be configured to sample and store as little as 100 or fewer samples or as much as 10,000 or more samples, depending on the available memory allocated for the samples, among other features. With respect to sampling rate, samples may be taken from every frame of the video signals stored in memory 44, from as few or fewer than a couple frames per second, or from any reasonable number of frames per second, for example. Thus, the sampling module 52 may be configured in any suitable manner to obtain an adequate sample of random pixel data during the course of a video presentation. Therefore, the actual sampling size and rate can be arbitrary and the design of the sampling module 52 may be changed according to other design factors.

Also, samples may be taken from any location within the boundary of the video image. Preferably, samples will be taken from anywhere on the video images. However, samples may be taken only at the periphery of the image, since the periphery may more closely represent the actual background color of the image. Also, samples may be taken from a central location of the image, which may represent the foreground color. Furthermore, the choice of where the samples are taken may be presented as an option for the user to select.

The samples obtained by the sampling module 52 may contain certain information about each particular pixel or this information may be extracted from the samples by the calculating module 54. For example, the calculating module 54 utilizes the luminance, or "luma", information and chrominance, or "chroma", information from the samples. The luma is the brightness of the light and the chroma is the color of the light. Luma is typically expressed as a single value, and chroma is expressed with respect to the red (R), green (G), and blue (B) components of the color. The calculating module 54 may use some or all of these values, among others, to determine color and brightness that represent a predominant color and brightness of the actual video image. This process is performed in real time using current and recently past samples for determining a representative color and brightness for the present video. As time progresses, older samples are replaced by newer samples and updated calculations are made. In this respect, the predominant color will likely change regularly as the video changes.

The calculating module 54 may use any suitable mathematical algorithms to determine a representative color and/ or brightness. For example, the calculating module 54 may calculate the average R component, average G component, and average B component from the samples. From the averages, the calculating module 54 may combine the averages to create the representative color. Alternatively, the calculating module 54 may calculate the representative color based on a color that is most frequently used in the particular stream of video images or based on a median color range. In addition, the calculating module 54 may utilize a method of least squares and may disregard or minimize a weighting factor of samples that exceed a certain standard deviation with respect to a norm. In this way, significantly different colors or brightness values can be eliminated to avoid improper skewing of the averages. Other statistical analysis may be used to calculate a representative color to properly blend in with the actual video images.

The calculating module 54 may continuously perform the above-mentioned statistical analysis on the samples directly from the sampling module 52. The calculating module 54 may also include a temporary storage device, such as a FIFO device, for storing the calculated representative colors and brightnesses. The transitioning module 56 takes the representative colors and brightnesses, calculated continuously by the calculating module 54, and effectively smoothes out the changes that may result from one instant to the next. The transitioning module 56 may also calculate averages of the representative colors and brightnesses over a period of time to provide a less fluctuating background pattern. The transitioning module 56 may essentially perform a sample and hold type function. When the video being displayed contains a substantially constant predominant color, the transitioning module 56 may recognize this condition as the same scene with only slight changes in color. In this case, the transitioning module 56 may maintain a constant background. However, when the video presentation includes a detectable change of scenes from one distinct color pattern to another, the transitioning module 56 may respond accordingly. When such a change is detected, the transitioning module 56 may create a natural morphing effect from one background color to another. This morphing effect can be spread out over time to eliminate a flashing effect. The transition time may be set to any time period, such as an instantaneous change to several seconds, if desired. Also, the transition time may be a parameter that can be adjusted by the viewer.

When a desired background color and brightness is calculated for each frame, or for several sequential frames, the transitioning module 56 transmits the color and brightness information to the memory interface 50. The memory interface 50 changes or adds the background information to the video signals and transmits the updated video signals into the frame buffers in memory 44. Referring back to FIG. 7, the decoder 46 reads the updated video signals from the frame buffers in memory 44 and transmits the signals to the display screen 34, e.g. television set. The display screen 34 displays the regular video images without alteration. However, any unused spaces created as a result of different aspect ratios are filled in with the color and brightness representing the calculated predominant color of the regular video. As a result of filling the areas outside the boundaries of the regular video image with the representative color, the display device 34 experiences a reduction in the negative effects of uneven burning. In this case, the contrast between the regularly illuminated video images and the unused portions of the screen are minimized by utilizing the filling functionality described herein.

Figure 9:
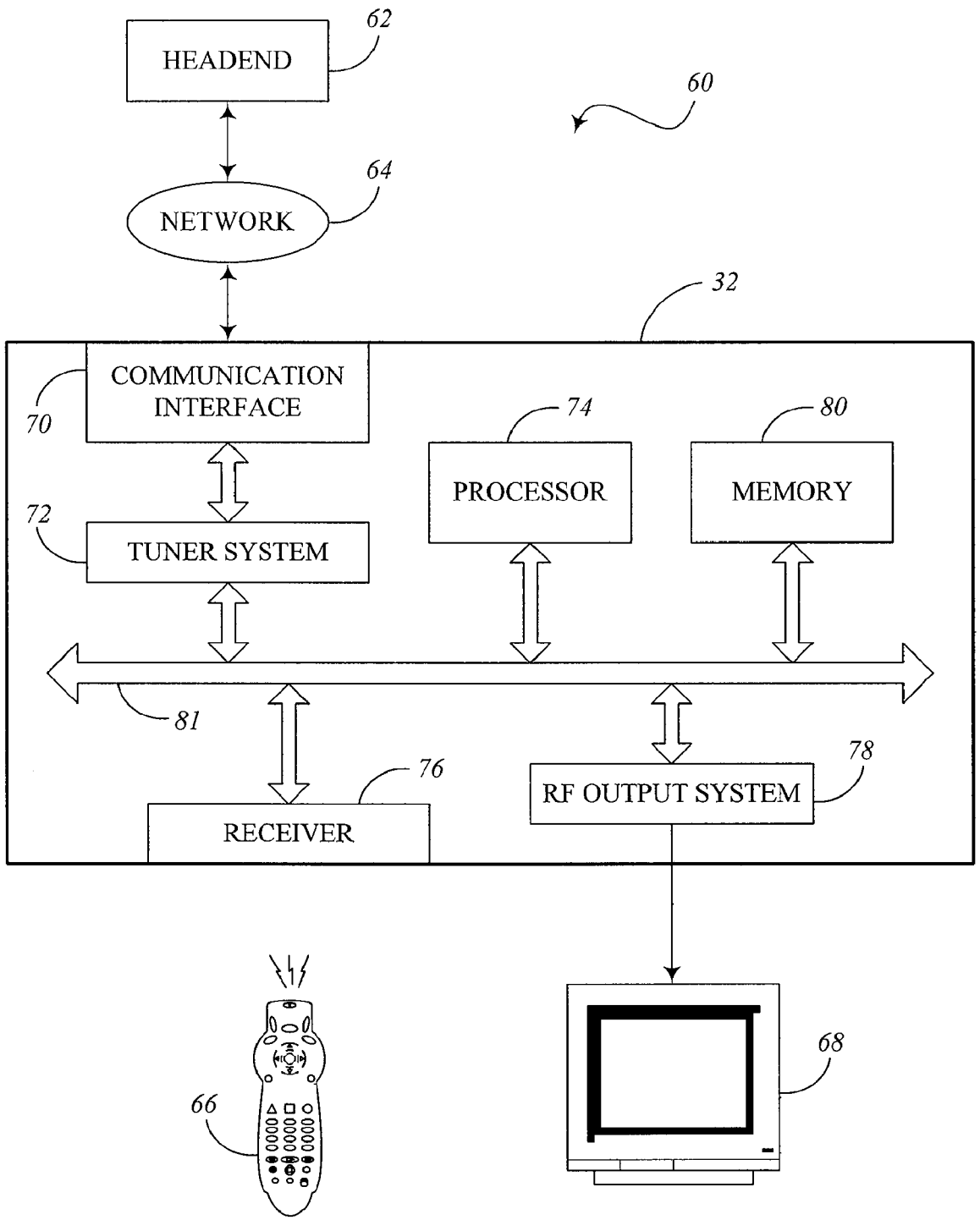
FIG. 9 is a block diagram of a third embodiment of the display screen controller shown in FIG. 5.

FIG. 9 is a block diagram of an embodiment of a video communication system 60 including a third embodiment of the display screen controller 32. The video communication system 60 also includes a headend 62, a communication network 64, a remote control device 66, and a television 68. In this embodiment, the display screen controller 32 is configured as a set-top box for controlling the television 68. The set-top box 32 includes a communication interface 70, tuner system 72, a processor 74, a receiver 76, an RF output system 78, and memory 80, each interconnected via a bus system 81.

The headend 62 communicates with the set-top box 32 via the communication network 64, which may include a combination of nodes, taps, etc. Some of the functionality performed by applications executed in the set-top box 32 may instead be performed at the headend 62 and vice versa. The communication interface 70 receives signals (video, audio and/or other data) from the headend 62 through the network 64 and provides reverse information to the headend 62 through the network 64. The processor 74 controls operations of the set-top box 32. The RF output system 78 drives the television 68, and the tuner system 72 tunes into a particular television channel to be displayed and is capable of sending and receiving various types of data or media to/from the headend 62. The tuner system 72 may include, in one implementation, an out-of-band tuner for bi-directional quadrature phase shift keying (QPSK) data communication and a quadrature amplitude modulation (QAM) tuner for receiving television signals.

Additionally, the receiver 76 is capable of receiving externally-generated information, such as user inputs or commands from other devices, such as the remote control device 66 or other suitable input device. The user inputs, for example, may be provided by a computer or transmitter with buttons or keys located either on the exterior of the set-top box 32 or a keyboard that includes user-actuated buttons. The set-top box 32 may also include one or more wireless or wired interfaces, also called ports, for receiving and/or transmitting data to other devices. For instance, the set-top box 32 may include a Universal Serial Bus (USB), Ethernet (for connection to a computer), IEEE-1394 (for connection to media devices in an entertainment center), serial, and/or parallel ports.

In one implementation, the set-top box 32 includes system memory 80, which includes flash memory and dynamic random access memory (DRAM), for storing various applications, modules, and data for execution and use by the processor 74. Basic functionality of the set-top box 32 is provided by an operating system that is primarily stored in flash memory. Among other things, the operating system includes at least one resource manager that provides an interface to resources of the set-top box 32 such as, for example, computing resources. Software applications may be downloaded from the headend 62 into memory 80. The applications may be run by the processor 74 for performing any number and type of video-related functions. The memory 80 may be configured using flash memory and DRAM as described with respect to FIG. 10.

Figure 10:
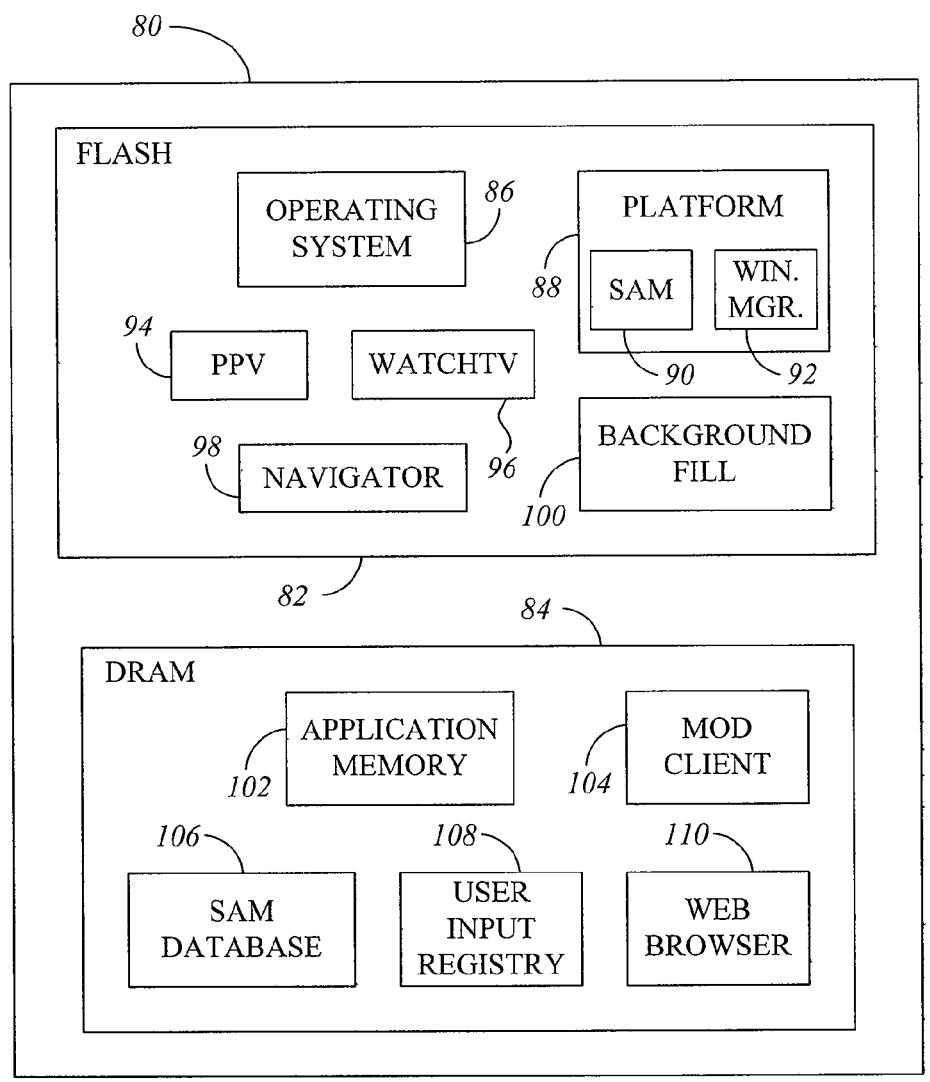
FIG. 10 is a block diagram of an embodiment of the memory shown in FIG. 9.

FIG. 10 is a block diagram of an embodiment of the memory 80 shown in FIG. 9. In this embodiment, the memory 80 includes flash memory 82 and DRAM 84. The flash memory 82 includes an operating system 86, platform 88, pay-per-view applications 94, WATCHTV applications 96, a navigator application 98, and background fill software 100. The DRAM 84 includes application memory 102, MOD client applications 104, a SAM database 106, user input registry 108, and a web browser 110.

The navigator application 98 residing in flash memory 82 provides a navigation framework for services provided by the set-top box 32. The navigator 98 registers for and in some cases reserves certain user inputs related to navigational keys such as channel increment/decrement, last channel, favorite channel, etc. Client applications may be resident in flash memory 82 or downloaded into DRAM 84. The navigator 98 also provides users with television related menu options that correspond to set-top box functions such as, for example, providing an interactive program guide, blocking a channel or a group of channels from being displayed in a channel menu, and displaying a video-on-demand purchase list.

The flash memory 82 also contains a platform library 88. The platform library 88 is a collection of utilities useful to applications, such as a timer manager, a compression manager, a configuration manager, an HTML parser, a database manager, a widget toolkit, a string manager, and other utilities (not shown). These utilities are accessed by applications via application programming interfaces (APIs) as necessary so that each application does not have to contain these utilities. Two components of the platform library 88 that are shown in FIG. 10 are a service application manager (SAM) client 90 and a window manager 92.

The window manager 92 provides a mechanism for implementing the sharing of the screen regions and user input. The window manager 92 on the set-top box 32 is responsible for, as directed by one or more applications, implementing the creation, display, and de-allocation of the screen resources. It allows multiple applications to share the screen by assigning ownership of screen regions, or windows. The window manager 92 also maintains, among other things, a user input registry 108 in DRAM 84 so that when a user enters a key or a command via the remote control device 66 or other input device, the user input registry 108 is accessed to determine which of various applications running on the set-top box 32 should receive data corresponding to the input key and in which order. As an application is executed, it registers a request to receive certain user input keys or commands. When the user presses a key corresponding to one of the commands on the remote control device 66, the command is received by the receiver 76 and relayed to the processor 74. The processor 44 dispatches the event to the operating system 86 where it is forwarded to the window manager 92 which ultimately accesses the user input registry 108 and routes data corresponding to the incoming command to the appropriate application.

The SAM client 90 is a client component of a client-server pair of components, with the server component being located at the headend 62. The SAM database 106 in DRAM 84 includes a data structure of services and a data structure of channels that are created and updated by the headend 62. Many services can be defined using the same application component, with different parameters. Examples of services include, without limitation and in accordance with one implementation, presenting television programs (available through a WatchTV application 96), pay-per-view events (available through a PPV application 94), digital music (not shown), media-on-demand, and an interactive program guide. In general, the identification of a service includes the identification of an executable application that provides the service along with a set of application-dependent parameters that indicate to the application the service to be provided. The SAM client 90 also interfaces with a resource manager (not shown) to control resources of the set-top box 32.

Application clients can also be downloaded into DRAM 52 at the request of the SAM client 90, typically in response to a request by the user or in response to a message from the headend 62. In the embodiment shown in FIG. 10, DRAM 84 contains the MOD client 104, web browser application 110, and others. It should be clear to one with ordinary skill in the art that these applications are not limiting and merely serve as examples for this present embodiment. Furthermore, one or more DRAM based applications may, as an alternative embodiment, be resident in the flash memory 82. These applications, and others provided by the cable system operator, are top-level software entities on the network for providing services to the user.

In one implementation, applications executing on the set-top box 32 work with the navigator 98 by abiding by several guidelines. First, an application utilizes the SAM client 90 for the provision, activation, and suspension of services. Second, an application shares set-top box resources with other applications and abides by the resource management policies of the SAM client 990, the operating system 86, and the set-top box 32. Third, an application handles situations where resources are only available with navigator 98 intervention. Fourth, when an application loses service authorization while providing a service, the application suspends the service via the SAM 90 (the navigator 98 will reactivate an individual service application when it later becomes authorized). Finally, an application client is designed to not have access to certain user input keys reserved by the navigator (i.e., power, channel +/−, volume+/−, etc.).

The MOD client application 104 provides the user with lists of available media titles to choose from and with video presentations requested by the user. The MOD client application 104 provides video presentations to the user by engaging, in some embodiments, in a direct two-way IP (Internet Protocol) connection with VOD content servers located at the headend 62.

Furthermore, the flash memory 82 includes background fill application 100 for filling the unused portions of the display screen with a color that blends in with the actual video images. The background fill application 100 operates in accordance with the teachings described in the present disclosure. The background fill application 100 may be downloaded from the headend 62 and updated if necessary.

Each of the above mentioned applications comprises executable instructions for implementing logical functions and can be embodied in any computer-readable medium for use by or in connection with an instruction execution system, apparatus, or device. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium.

The remote control device 66 may include, for example, arrow buttons such as an up arrow button, a down arrow button, a left arrow button, and a right arrow button 86 that are used to scroll through options and/or to highlight an option. The remote control device 66 may also include a select button that may be used to select a currently highlighted option that is provided to the user.

Figure 11:
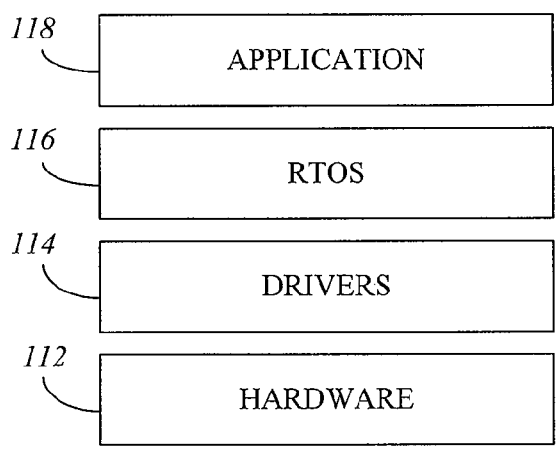
FIG. 11 is a diagram illustrating the levels of software of an exemplary computer program for filling unused portions of a display screen.

FIG. 11 is a diagram illustrating, in general block form, the levels of the background fill software 100 shown in FIG. 10. The background fill software 100 includes a hardware level 112, a driver level 114, a real-time operating system (RTOS) level 116, and an application level 118. The hardware level 112 includes physical components, such as processors or other suitable hardware components, which perform the actual processing steps for filling the unused, or background, portions of the display screen. The driver level 114 provides communication between the hardware and software. This level may also retrieve video information from memory for the hardware components. The RTOS level 116 allows the real time operation of calculations on the video data to obtain substantially simultaneous color representations for the background of current video images. The application level 118 includes the process code for performing the functions of the background filling operation.

FIG. 12 is a diagram of an embodiment of a graphical user interface (GUI) 120, controlled by the window manager 92 (FIG. 10) allowing a viewer or user to control certain aspects of the background fill functions. A user may access the GUI 120 by any suitable data entry mechanism, such as the remote control device 66 described above. The GUI 120 allows the user to alter characteristics of the background color, the rate of change of the background color, and which portions of the main video image the background color is intended to match.

With respect to altering the color, the user may select one of several available colors. In this embodiment, the available colors are "chameleon", black, white, black/white, gray, black/white/gray, red, green, and blue. The chameleon color is the default color if no other colors are selected. When the chameleon color is selected, or this color is left as the default, the background fill application 100 is executed to determine a predominant color of the actual video image and applying or filling a color in the unused portions of the display screen for matching the predominant color.

Otherwise, if another color is selected, alternative processes may be run. These processes may include altering the methods described herein. For example, if "black/white" is selected, the calculating module 54 (FIG. 8) may be configured to simply analyze the brightness factor and disregard the color components. In this case, if the intensity of the light is above a certain threshold, the background color would be white, and if it is below the threshold, the background color would be black. Similarly, if "black/white/gray" is selected, the calculating module 54 may analyze only the brightness factor and determine a sliding gray scale color that matches the intensity of the light. If a single color such as black, white, gray, red, green, or blue is selected, the background fill software simply colors the unused portions of the screen the respective selected color. If a choice other that chameleon is selected, the GUI shown in FIG. 13, as described below, may be displayed.

Another choice that the user may select is the rate of color change. This selection allows a user to select how quickly the background color changes over time. In this embodiment, the selectable options are fast, medium fast, medium, medium slow, and slow. In this example, "medium" is the default. Alternatively, a graduated scale having finer control may be used for controlling rate color change. When a rate of color change is selected or altered, the transitioning module 56 (FIG. 8) adjusts how it interprets the samples. For example, the transitioning module 56 may utilize a maximum number of samples covering a maximum time period when the "slow" selection is made and may utilize a minimal number of samples over a minimal time period when the "fast" selection is made.

With respect to the "matching portion" option of the GUI 120, the user may select from which portions of the actual video image samples are taken. In this embodiment, the user may select the "match entire image" (default), "match background", or "match foreground". In this example, the term "background", when presented to the user, refers to the colors of the periphery or portions of the actual video image that are likely out of focus. For instance, the user may choose the "match background" option. In this case, the color that fills in the unused spaces of the display screen is matched with the background colors of the actual video images. In this respect, samples may be taken only at the periphery of the video image. In this same respect, samples may alternatively be taken only near the border between the actual video image and the unused portions of the screen. To accomplish a selected adjustment from the default of the "matching portion" category, the memory interface 50 and/or sampling module 52 (FIG. 8) may take pixel samples only from peripheral portions of the video image.

The user may also select the "match entire image" option, which causes the memory interface 50 and/or sampling module 52 to sample from the entire video image. This option may be presented as the default option. Alternatively, the user may also select the "match foreground". In this example, the memory interface 50 and/or sampling module 52 sample from pixels located closer to the center of the video image.

FIG. 13 is a diagram of an embodiment of a GUI 130 that may be displayed to a user when a certain color is selected with respect to the GUI 120 of FIG. 12. The GUI 130 of FIG. 13 includes a warning that by selecting a particular color, the video screen may experience uneven burning patterns. The illustrated warning or any other suitable warning may be used to inform the user of the possible effects of the change, since certain selections might disable functions, such as the ones disclosed herein, for maintaining a more even burning effect on the display screen. The GUI 130 also include a back button allowing the user to return to GUI 120 and possibly change the color selection. Also, an "end" button is available allowing the user to complete the background color adjustment feature and return to a normal viewing mode.

Figure 14:
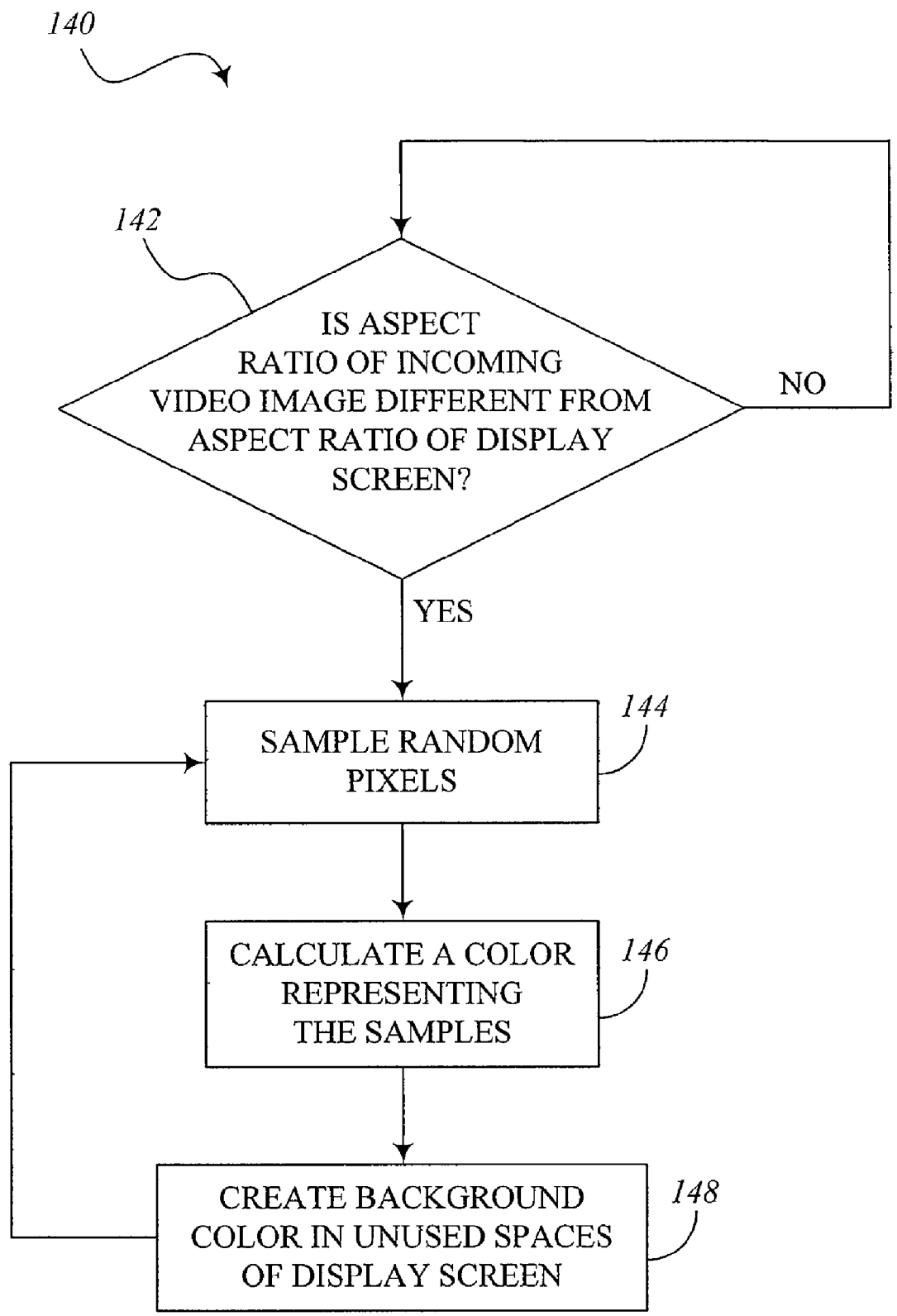
FIG. 14 is a flow chart of an embodiment of a process for filling the unused portions of a display screen.

FIG. 14 is a flow chart 140 of an embodiment of a process for filling unused portions of a display screen. As illustrated, the flow chart 140 includes a continuous flow for constantly controlling the filling of unused spaces. Alternatively, however, the flow chart 140 may be modified to include definite start and end points.

The process, as shown, includes determining whether the aspect ratio of an incoming video image is different from the aspect ratio of the display screen on which the video image is to be displayed, as depicted in decision block 142. If the aspect ratios are not different, then the process flows back to the decision block 142 for comparing the aspect ratio of video signals at a later time. If the answer of block 142 is affirmative, indicating a difference in aspect ratios, then flow proceeds to block 144. In block 144, pixels of the actual video image are sampled. As mentioned with respect to FIG. 12, a background filling application samples according to selections may be the user or according to default setting. Also, the process can be modified to include any suitable sample size and rate at which samples are taken.

In block 146, a color is calculated for representing the sampled pixels. The representative color may be calculated based on averages of color components or other suitable mathematical algorithms. Calculating the representative color, as defined in block 146, also includes calculating a certain portion of the samples based on time constraints. For example, a color can be calculated based on a more gradually changing color, thereby reducing an effect of flashing from one color to another. Analysis may include averaging the colors over an adjustable period of time. In block 148, the calculated background color is added or applied along the sides of the unused portions of the screen not already occupied by the actual video image. The flow chart 140 proceeds at this point back to block 144 to randomly sample another video frame that might exist later in time. Blocks 144, 146, and 148 are repeated continuously to provide an adequate background color. Alternatively, the process may return to decision block 142 to determine whether the aspect ratios are different. The status of aspect ratios may change, for instance, if a user of a HD television switches from a HD broadcast to a SD broadcast, or vice versa.

The flow chart of FIG. 14 shows the architecture, functionality, and operation of a possible implementation of the background fill software 100 (FIG. 10). In this regard, each block represents a module, segment, or portion of code, which comprises one or more executable instructions for implementing the specified logical functions or steps in the process. It should also be noted that in some alternative implementations, the functions noted in the blocks may not occur at all or may occur out of the order noted in FIG. 14. For example, two blocks shown in succession in FIG. 14 may in fact be executed substantially concurrently to allow for real-time processing or the blocks may sometimes be executed in the reverse order, depending upon the functionality involved, as would be understood by those reasonably skilled in the art of the present disclosure.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of the present disclosure and protected by the following claims.

I claim:

1. A system for displaying a video image, the system comprising:
    a display screen configured to display a stream of video images; and
    a display screen controller configured to control the display screen, the display screen controller including
        a sampling device for sampling a plurality of pixels from the stream of video images, wherein the pixels are sampled from one of the central location of the images or the periphery of the images as selected by a user,
        a calculating device for calculating an average color of the plurality of sampled pixels, wherein the calculating device minimizes a weighting factor for sampled pixels that exceed a pre-determined standard deviation,
        a transitioning device for determining appropriate rates of change in the calculated average colors; and
        an adding device for adding color bands in unused portions of the display screen, the color bands comprising a color corresponding to the calculated average color and the determined rate of change.

2. The system of claim 1, wherein the unused portions of the display screen are created when the display screen is configured with an aspect ratio that is different from the aspect ratio of the video image.

3. The system of claim 1, wherein the unused portions of the display screen include portions of the display screen outside the boundary of the video images.

4. The system of claim 1, wherein the sampling device is configured to sample the pixels over a predetermined time period, and wherein the calculating device is configured to calculate the average color of the sampled pixels over the predetermined time period.

5. The system of claim 4, wherein the calculating device is further configured to average the light intensity of the sampled pixels.

6. The system of claim 5, wherein the calculating device is further configured to cause the adding device to adjust the color and intensity of the color bands with respect to the samples of pixels averaged over a predetermined time period.

7. The system of claim 1, wherein the sampling device is configured to sample the pixels based on a random selection of pixels.

8. A method for displaying video images on a display screen, the method comprising:
    determining whether or not color bands are to be displayed on a display screen configured to display a stream of video images;
    filling blank spaces of the display screen with color bands having a color representing an approximation of a predominant color of at least a portion of the stream of video images when it is determined that the color bands are to be displayed, wherein pixels are sampled from the stream of video images for determination of the predominant color from one of the central location of the images or the periphery of the images as selected by a user, wherein the determination of the predominant color minimizes a weighting factor for sampled pixels that exceed a pre-determined standard deviation; and
    transitioning the predominant color based on determined rates of change in the predominant color.

9. The method of claim 8, wherein determining whether or not color bands are to be displayed further includes determining whether or not the aspect ratio of the stream of video images is the same as the aspect ratio of the display screen, and filling blank spaces includes filling blank spaces when it is determined that the aspect ratio of the stream of video images is not the same as the aspect ratio of the display screen.

10. The method of claim 8, wherein filling the blank spaces of the display screen further comprises:
    sampling a number of random pixels over a predetermined time period; and
    calculating the approximation of the predominant color based on the sample of pixels.

11. The method of claim 10, further comprising:
    enabling a user to adjust parameters of the color bands.

12. The method of claim 11, wherein the adjustable parameters of the color bands comprise a color setting, a rate of color change setting, and a match portion setting of the video images from which the random pixels are sampled.

13. The method of claim 12, further comprising:
    enabling a user to select the color setting to replace the approximation of the predominant color.

14. The method of claim 8, further comprising:
    calculating the approximation of the predominant color by at least one mathematical algorithm including averaging the individual color components of red, green, and blue, and determining a median color range.

15. A computer-readable storage medium having a computer program for filling the unused portions of a display screen, the computer program comprising:
- logic configured to sample a plurality of pixels from a plurality of frames of a stream of video images to be displayed on a display screen, wherein the pixels are sampled from one of the central location of the images or the periphery of the images as selected by a user;
- logic configured to process the sampled pixels to determine a background color representing an approximation of a predominant color of the video images wherein the determination of a background color minimizes a weighting factor for sampled pixels that exceed a predetermined standard deviation;
- logic configured to fill unused spaces of the display screen with the background color; and
- logic configured to transition the predominant color based on determined rates of change in the predominant color.

16. The computer-readable medium of claim 15, wherein the logic configured to sample pixels is further configured to sample the pixels over a predetermined time period.

17. The computer-readable medium of claim 15, wherein the computer program further comprises logic configured to create a graphical user interface allowing a user to adjust parameters of the background color.

18. The computer-readable medium of claim 17, wherein the graphical user interface allows a user to select a set color for the background color, to select how quickly the background color is allowed to change, and to select from which portion of the video images the pixels are sampled.

19. The computer-readable medium of claim 15, wherein the logic configured to process the samples utilizes a mathematical algorithm including averaging of color components of the samples.

20. The computer-readable medium of claim 15, further comprising:
- logic configured to determine whether or not the aspect ratio of the stream of video images is the same as the aspect ratio of the display screen.

* * * * *